United States Patent
Michael et al.

(10) Patent No.: US 10,926,611 B2
(45) Date of Patent: Feb. 23, 2021

(54) AIR-CONDITIONING SYSTEM OF A MOTOR VEHICLE

(71) Applicant: Mahle International GmbH, Stuttgart (DE)

(72) Inventors: Markus Michael, Ilsfeld (DE); Walter Wolf, Oppenweiler-Zell (DE); Anja Reiter, Schorndorf (DE); Florian Klein, Bad Liebenzell (DE)

(73) Assignee: Mahle International GmbH

( * ) Notice: Subject to any disclaimer, the term of this patent is extended or adjusted under 35 U.S.C. 154(b) by 240 days.

(21) Appl. No.: 16/120,297

(22) Filed: Sep. 2, 2018

(65) Prior Publication Data

US 2019/0100081 A1 Apr. 4, 2019

(30) Foreign Application Priority Data

Sep. 4, 2017 (DE) .......................... 102017215462.4

(51) Int. Cl.
| | |
|---|---|
| *B01D 46/44* | (2006.01) |
| *B01D 46/46* | (2006.01) |
| *B60H 3/06* | (2006.01) |
| *B60H 1/00* | (2006.01) |

(52) U.S. Cl.
CPC ......... *B60H 3/0625* (2013.01); *B01D 46/442* (2013.01); *B01D 46/46* (2013.01); *B60H 1/008* (2013.01); *B60H 1/00792* (2013.01); *B01D 2279/40* (2013.01); *B01D 2279/50* (2013.01); *B60H 2003/0683* (2013.01)

(58) Field of Classification Search
CPC ..... B60H 3/0078; B01D 46/46; B01D 46/442
USPC ..................... 55/417, 421, 423, 424
See application file for complete search history.

(56) References Cited

U.S. PATENT DOCUMENTS

| | | | |
|---|---|---|---|
| 6,520,418 B2 | 2/2003 | Kunze et al. | |
| 10,245,924 B2 * | 4/2019 | Newman ............. | B01D 46/442 |

FOREIGN PATENT DOCUMENTS

| | | | |
|---|---|---|---|
| DE | 32 40 939 A1 | 5/1983 | |
| DE | 101 04 179 A1 | 7/2002 | |
| GB | 2108663 A | 5/1983 | |
| JP | 10019833 A * | 1/1998 | ............. G01N 27/28 |

* cited by examiner

*Primary Examiner* — Robert A Hopkins
(74) *Attorney, Agent, or Firm* — Fishman Stewart PLLC

(57) ABSTRACT

An air-conditioning system of a motor vehicle to air-condition a vehicle interior may include a channel system through which air is flowable and an outside-air channel configured to let outside air into the channel system. The air-conditioning system may also include a system conveying device separating a suction area from a pressure area and a system filter device separating a raw area from a pure area. The system filter device may include a filter housing and a filter material. The air-conditioning system may additionally include a system outlet to let air into the vehicle interior and a sensor device, including a sensor housing, in which at least one analysis channel is arranged, through which air, a characteristic of which is measured, is flowable. The sensor device may also include at least one sensor inlet and at least one sensor outlet to let air in and out of the sensor device.

20 Claims, 4 Drawing Sheets

AIR-CONDITIONING SYSTEM OF A MOTOR VEHICLE

CROSS-REFERENCE TO RELATED APPLICATIONS

This application claims priority to German Patent Application No. DE 10 2017 215 462.4, filed on Sep. 4, 2017, the contents of which are hereby incorporated by reference in its entirety.

TECHNICAL FIELD

The present invention relates to an air-conditioning system of a motor vehicle for air-conditioning a motor vehicle interior. The invention furthermore relates to a motor vehicle with such an air-conditioning system.

BACKGROUND

An air-conditioning system according to the class, also referred to as an air-conditioning installation, is used to air-condition a motor vehicle interior of a motor vehicle. For this purpose, the air-conditioning system applies air to the motor vehicle interior, which can be air-conditioned with the aid of at least one heat exchanger of the air-conditioning system. Usually, the air supplied to the motor vehicle interior is conveyed out of the ambient environment of the motor vehicle and is guided through a filter device of the air-conditioning system before the air, which is cleaned with the filter device, is supplied to the motor vehicle interior. The quality of the air from the ambient environment of the motor vehicle, also referred to as outside air, can vary and, in particular, can change during vehicle travel. In accordance with this, depending on the quality of the outside air, it is desirable to supply the air-conditioning system and thereby, ultimately the motor vehicle interior with more or less outside air. For this reason, it is expedient to provide a sensor device, with which the at least one characteristic of air can be measured in order to operate the air-conditioning system accordingly.

Thereby, such sensor devices require additional assembly space, as well as additional fluidic lines to supply air so that, altogether, the air-conditioning system entails an increased level of assembly-space requirements and/or is more elaborate to manufacture.

SUMMARY

The present invention therefore deals with the task of indicating improved or at least alternative embodiments for an air-conditioning system of the aforementioned type, as well as for a motor vehicle with such an air-conditioning system, which are particularly characterized by reduced assembly-space requirements and/or simple, as well as inexpensive installation.

According to the invention, the task is achieved by means of the features of the independent claim(s). Favourable embodiments are the object of the dependent claim(s).

The present invention is based on the general idea of arranging a sensor device of an air-conditioning system to analyse air as close to the filter housing of a filter device of the air-conditioning system as possible to filter air being supplied to a motor vehicle interior. Such an arrangement of the sensor device makes simplified tapping of both air that has been cleaned by the filter device, as well as air that has not been cleaned by the filter device so that corresponding fluidic connections can be minimized and/or reduced. Furthermore, the arrangement of the sensor device in the proximity of the filter device allows for a compact construction of the air-conditioning system since the sensor device can be provided in an assembly-space-saving manner within the air-conditioning system. Altogether, thereby, the air-conditioning system is more assembly-space-saving and can be installed in a simplified manner, wherein the simplified installation additionally contributes to the cost reduction of the air-conditioning system. According to the inventive idea, the air-conditioning system comprises a channel system that air flows through during operation, which comprises an outlet to let air out into the motor vehicle interior, hereinafter also referred to as a system outlet. Furthermore, the channel system comprises an outside-air channel, which serves to let outside air, meaning air from the ambient environment, into the channel system. In addition, the filter device is arranged in the channel system, which is hereinafter also referred to in the following as a system filter device. The filter device serves to filter air and comprises a filter material to filter the air, which is arranged in the filter housing of the filter device. Thereby, the filter material can be a component of the filter element. In addition, the filter material can be arranged in the filter housing and can be replaced. The filter material and thereby, the filter device therefore subdivides the channel system into an upstream-side raw area and a downstream-side pure area. The system outlet is expediently arranged within the pure area so that air enters into the motor vehicle interior after flowing through the filter device. The sensor device comprises a sensor housing, in which at least one analysis channel where air to be analysed can flow through is arranged. According to the invention, it is provided that the sensor housing is arranged on the filter housing in order to implement the said close arrangement of the sensor device on the filter device. Arranging the sensor housing on the filter housing means, in particular, that the sensor housing abuts the filter housing.

The air-conditioning system expediently comprises a conveying device to convey air, which is arranged within the channel system and separates an upstream-side suction area from a downstream-side pressure area. In particular, during operation of the conveying device, a vacuum prevails in the suction area whereas, in the pressure area, an overpressure prevails.

The air-conditioning system preferably comprises at least one heat exchanger, which air flows through during operation. The at least one heat exchanger is arranged within the channel system upstream to the system outlet and allows air-conditioning during operation, thereby changing the temperature of the air and/or the moisture within the air.

The sensor device expediently comprises at least one inlet to let air in, hereinafter also referred to as a sensor inlet, as well as an outlet to let air out of the sensor device, hereinafter also referred to as a sensor outlet. Thereby, at least one of the sensor inlets is fluidically connected or can be connected to such an analysis channel, for example, by means of the valve and the like so that air can flow into the sensor device to measure the at least one characteristic, hereinafter also referred to as air to be analysed.

The characteristic of the air measured by the sensor device is preferably such a characteristic, which reflects to the quality of the air or correlates with the quality. Thereby, in particular, this can have to do with the number and/or density of particles within the air. In particular, the characteristic analysed with the aid of the sensor device can be the fine-particle density within the air. Thereby, air with a low level of fine-particle density comprises a higher level of quality than the air with a higher fine-particle density. The at least one characteristic can also be the concentration of nitrogen oxides and/or carbon oxides and/or oxygen and the like in the air.

It is conceivable to provide at least one such analysis channel with an interaction section, in which the measurement of at least one characteristic of the air occurs.

The sensor device preferably uses electromagnetic waves to measure the at least one characteristic of the air. This allows for a simple and precise determination of the at least one characteristic of the air. For this purpose, the sensor device preferably comprises a generation device to generate the electromagnetic waves, which pass through and, in particular, penetrate the at least one analysis channel to measure the at least one characteristic, thereby interacting with the air flowing through the analysis channel in the interaction section. The generation device can principally generate electromagnetic waves of any kind, meaning in particular, any wavelength and/or period. In particular, the generation device can generate and emit pulsed electromagnetic waves. In addition, the generation device can also generate and emit monochromatic electromagnetic waves.

The sensor device furthermore comprises at least one detector, which detects the electromagnetic waves after passing through the analysis channel and interacting with the air in order to determine the at least one characteristic of the air.

Preferred embodiments provide for a generation device, which generates electromagnetic waves within the optical range. The generation device is preferably designed as an optical generation device. The generation device thereby preferably comprises a laser or is designed as such a laser. By means of this, the generation device can be implemented in a simplified manner and/or be integrated into the air-conditioning system. The wavelength of the electromagnetic waves and the light is, for example, within the range of the magnitude of the particles measured in the air, in particularly the smallest ones and is, in particular, between 10 and 10,000 nanometres.

In the case of preferred embodiments, the filter housing in the sensor housing can be directly arranged on each other, in particular, directly abutting each other. Such an arrangement results in a particularly compact design of the air-conditioning system. In addition, air that has not yet been cleaned by the filter material, hereinafter also referred to as raw air, both upstream to the filter material as well as clean air downstream from the filter material that has been cleaned by the filter material, hereinafter also referred to as pure air, can be removed and supplied to the sensor device easily and by means of a reduced number fluidic connections.

Thereby, it is conceivable that the filter housing and the sensor housing comprise a joint wall. This leads to a further improvement of the assembly-space-saving construction of the air-conditioning system and/or to a reduction and/or a decline in the components required to supply air to the sensor device.

It is favourable if a raw branch-off point is arranged within the raw area, which is provided to let raw air, in particular, outside air, into the sensor device. Thereby, the raw branch-off point is fluidically connected or can be fluidically connected to such a sensor inlet.

It is preferred if the raw branch-off point is provided directly on the filter device. Thereby, air-conditioning system can be constructed in a more compact manner and/or the fluidic connections to the sensor device can be implemented in a shorter and/or assembly-space saving manner. It is particularly preferred if the raw branch-off point is arranged on the filter housing, in particular, designed within the filter housing. The raw branch-off point can be an opening in the filter housing.

In addition or as an alternative, it is conceivable to directly supply the sensor device with outside air. For this reason, a sensor inlet channel can be provided, which is separate from the outside-air channel and connected to the ambient environment. It is also conceivable that the sensor inlet channel branches off from the outside-air channel upstream to the filter device at a point separate from the raw branch-off point.

It is favourable if a pure branch-off point is arranged to supply pure air to the sensor device, thereby letting pure air into the sensor device within the pure area. Thereby, it is preferred if the pure branch-off point is arranged or designed directly on the filter device, in particular, on the filter housing. The pure branch-off point can be an opening in the filter housing. By means of this, the air-conditioning system can be manufactured in an assembly-space-saving and simple manner.

It is to be understood that the sensor device can comprise a plurality of such sensor inlets, wherein such a sensor inlet is fluidically connected to the pure branch-off point and another such sensor inlet is fluidically connected to the raw branch-off point. Another such a sensor inlet can also be fluidically connected to the sensor inlet channel. Thereby, such an intrinsic analysis channel can be assigned to the respective sensor inlet. It is also conceivable that such an analysis channel is assigned to two such sensor inlets, wherein the analysis channel, for example, with the aid of a valve and/or a flap, is optionally connected to the respective sensor inlet.

Embodiments are also conceivable, where the sensor device only comprises such a sensor inlet, which is optionally fluidically connected to the pure branch-off point and/or the raw branch-off point and/or the sensor inlet channel, for example, with the aid of a valve or a flap.

The sensor device can also be fluidically connected to the motor vehicle interior in order to supply the sensor device, in particular, such an analysis channel, with air out of the motor vehicle interior, hereinafter also referred to as inside air. For this purpose, a sensor inside air supply channel, which is fluidically connected to the motor vehicle interior, can be connected or can be connected to such a sensor inlet.

It is preferred if the air-conditioning system comprises a circulating-air channel, which serves to recirculate air from the motor vehicle interior. The circulating-air channel is fluidically connected to the motor vehicle interior and the system outlet so that air can flow out of the motor vehicle interior via the circulating-air channel to the system outlet again into the motor vehicle interior. By means of this, it is possible to operate the air-conditioning system in a circulating-air mode in such a way that no outside air is supplied to the motor vehicle interior. Naturally, by means of this, it is also possible to operate the air-conditioning system in a mixed mode, in which air from the ambient environment and thereby, outside air and partially recirculated air from the motor vehicle interior, thereby being inside air, is partially supplied to the motor vehicle interior. Thereby, the air is led through the system filter device in order to filter it, preferably before flowing through the system outlet respectively.

The outside air is preferably cleaned after flowing through the filter device and supplied to the motor vehicle interior. Preferably, cleaned outside air is supplied to the motor vehicle interior, wherein, in the following, for the sake of simplicity, the cleaned outside air is also referred to as outside air, wherein it is clear that the outside air is supplied after passing through the filter device, thereby being cleaned outside air.

In order to switch over between circulating-air mode and outside-air mode, the air-conditioning system preferably comprises a shutoff device, which comprises an outside-air shutoff valve provided in the outside-air channel and a circulating-air shutoff valve provided in the circulating-air channel. The shutoff device can be adjusted between a circulating-air position and an outside-air position, wherein, in the circulating-air position, the outside-air shutoff valve shuts off the outside channel and the circulating-air shutoff valve releases the circulating-air channel whereas, in the outside-air position, the outside-air shutoff valve releases the outside-air channel and the circulating-air shutoff valve shuts off the circulating-air channel. Naturally, mixed positions are also conceivable where the circulating-air shutoff valve and/or the outside-air shutoff valve partially shut off or release the related channel.

The air-conditioning system favourably comprises a control device that adjusts the shutoff device during operation accordingly. The control device is preferably connected to the sensor device on a communicative level so that the control device adjusts the shutoff device independently of the measured characteristic of the air. The control device is preferably designed in such a way that it operates the air-conditioning system in circulating-air mode if the quality of the uncleaned outside air originating from the ambient environment undershoots a specified value, in particular being worse than the quality of the air in the motor vehicle interior or the inside air. In circulating-air mode, the shutoff device is in the circulating-air position. In addition, the control device operates the air-conditioning system in an outside-air mode if the uncleaned outside air originating from the ambient environment has a quality that exceeds a specified value and/or if the quality of the outside air is better than the quality of the air from the vehicle interior. Pure air can also be used as a quality of the air from the vehicle interior or as an indication for it, which is supplied to the sensor device via the pure branch-off point.

In the circulating-air position, inside air can be supplied to the sensor device via the raw branch-off point if the circulating-air channel upstream to the raw branch-off point flows into the channel system, whereas, in the outside-air position, cleaned outside air is supplied to the sensor device. Analogously, it is possible, via the pure branch-off point and in the outside-air position, to supply cleaned outside air to the sensor device and to supply cleaned inside air to the sensor device in the circulating-air position. Different air can be supplied to the sensor device depending on the position of the shutoff device via the same branch-off point respectively. This simplifies the construction and installation of the air-conditioning system and additionally allows for conclusions to be made concerning the filter effect of the filter material. In particular, thereby, a required replacement of the filter material can be determined.

Favourable variants provide that the system conveying device is arranged between the circulating-air shutoff valve and the outside-air shutoff valve. By means of this, it is possible to convey outside air with the same conveying device in the outside-air position and, in the circulating-air position, to circulate inside air from the motor vehicle interior.

It is conceivable to provide a flow-in opening in the suction area of the channel system, which is fluidically connected or can be fluidically connected to such a sensor outlet. By means of this, air is sucked from the sensor device using the system conveying device. Thereby, in particular, it can do with the air flowing through the respective analysis channel. It is also conceivable to rinse the sensor device or generate a vacuum in it.

The flow-in opening is preferably arranged in the area of the housing of the system conveying device, hereinafter also referred to in the following as a conveying device housing, in particular, on the conveying device housing, in which a rotor, for example, a fan propeller or a blower propeller, which conveys air during operation, is arranged. Furthermore, it is favourable if the branch-off point is arranged to branch-off air for the sensor device from the pure area and/or from the raw area, which is fluidically connected to such a sensor inlet, meaning, in particular, the raw branch-off point and/or the pure branch-off point, also in the area of the conveying device housing, in particular, on the conveying device housing and upstream to flow-in opening. This leads to a particularly high pressure differential between the branch-off point and the flow-in opening so that the sensor device is effectively supplied with air with the aid of the system conveying device. Thereby, the knowledge is used that a particularly high difference in the pressure of the air is predominate in the channel system directly on the suction side of the conveying device housing. Thereby, with such an arrangement of the flow-in opening and the branch-off point, a high level of suction performance for supplying the sensor device with air can be achieved. For example, this leads to a sufficient supply of air to the sensor device being able to be achieved, even in the case of low conveying capacity of the system conveying device so that the conveying capacity can be reduced. Thereby, it is additionally possible to also supply the sensor device with air during an idling operation of the vehicle. Furthermore, it is conceivable to arrange a flow restrictor to limit the air flow through the sensor device between the branch-off point and the flow-in opening in order to implement a maximum limit for supplying air to the sensor device.

Another improvement of the supply to the sensor device results if the conveying device housing has an inlet frame on the suction side, which is nozzle-shaped, thereby being tapered toward the rotor. Thereby, the flow-in opening is arranged in the area of the inlet frame, in particular, on the inlet frame. The branch-off point is also favourably arranged in the area of the inlet frame, particular on the inlet frame. Thereby, another increase of the pressure differential between the branch-off point and the flow-in opening results so that an improved supply of air to the sensor device results.

The flow-in opening can be orientated relative to the flow direction of the air in any way. Embodiments are also conceivable where the flow-in opening is orientated in the flow direction or against the flow direction in an inclined manner.

In addition or as an alternative, it is conceivable to provide a sensor conveying device that is separate from the system conveying device, in particular, a suction jet pump, which comprises a suction inlet, which is fluidically connected to such a sensor outlet so that the suction jet pump sucks air from the sensor device during operation, thereby conveying it through the sensor device.

Thereby, thought must be given to embodiments where a pump outlet of the suction jet pump, via which the air from the suction jet pump flows, is fluidically connected to a flow-in opening arranged in the area of the conveying device housing, in particular, on the conveying device housing, in particular the inlet frame. Thereby, another improvement of the air supply to the sensor device is achieved.

It is to be understood that, into addition to the air-conditioning system, a motor vehicle with a vehicle interior and such an air-conditioning system to air-condition the vehicle interior is part of the scope of this invention.

Other important features and advantages of the invention result from the subclaims, the drawings and the related figure description based on the drawings.

It is to be understood that the features explained in the aforementioned and following cannot only be used in the respectively indicated combination, but also in other combinations or alone, without departing from the scope of the present invention.

Preferred exemplary embodiments of the invention are represented in the drawings and will be described in more detail in the following description, wherein the same reference numbers will refer to the same or similar or functionally identical components.

BRIEF DESCRIPTION OF THE DRAWINGS

Thereby, the figures schematically show

DETAILED DESCRIPTION

Figure 1:
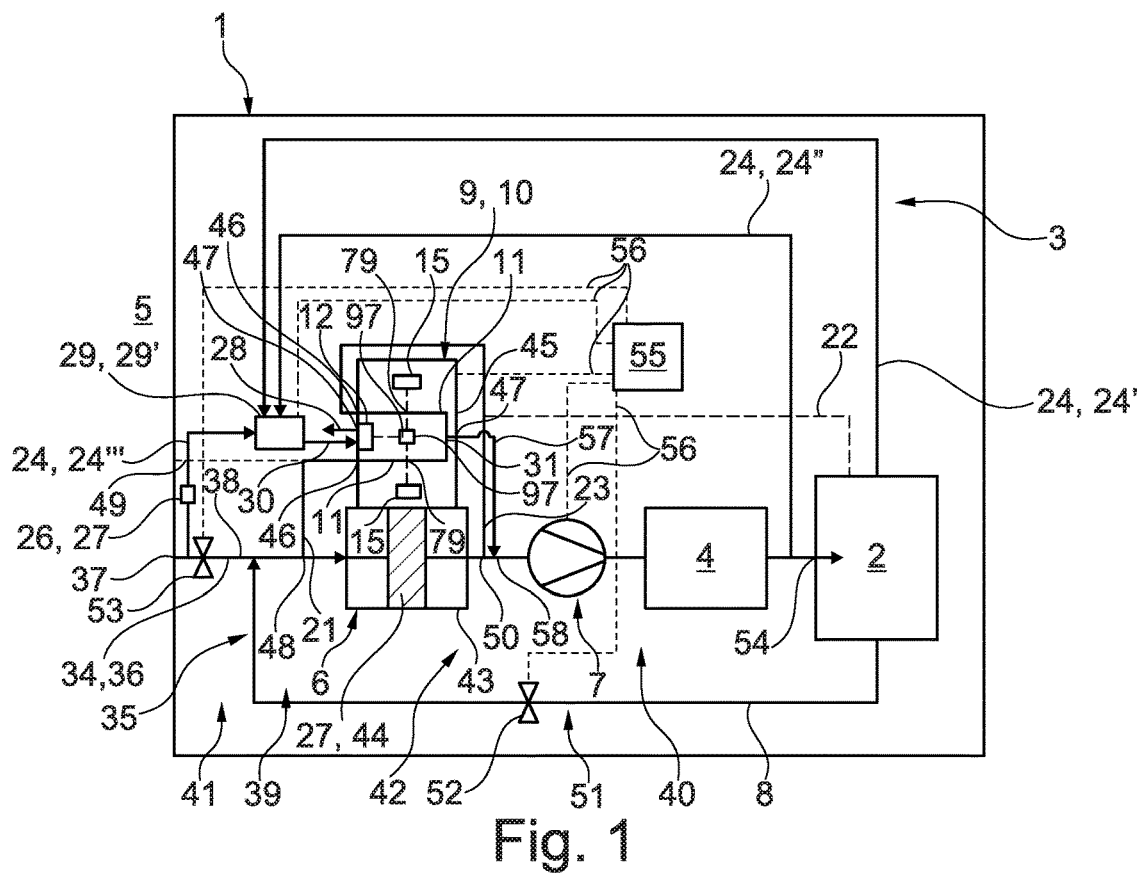
FIG. 1 a strongly simplified, schematic-like representation of a motor vehicle with an air-conditioning system, FIG. 2 a strongly simplified schematic-like representation of the motor vehicle in the case of another exemplary embodiment, FIG. 3 an enlarged representation of the area in FIG. 2 indicated with III.
Figure 2:
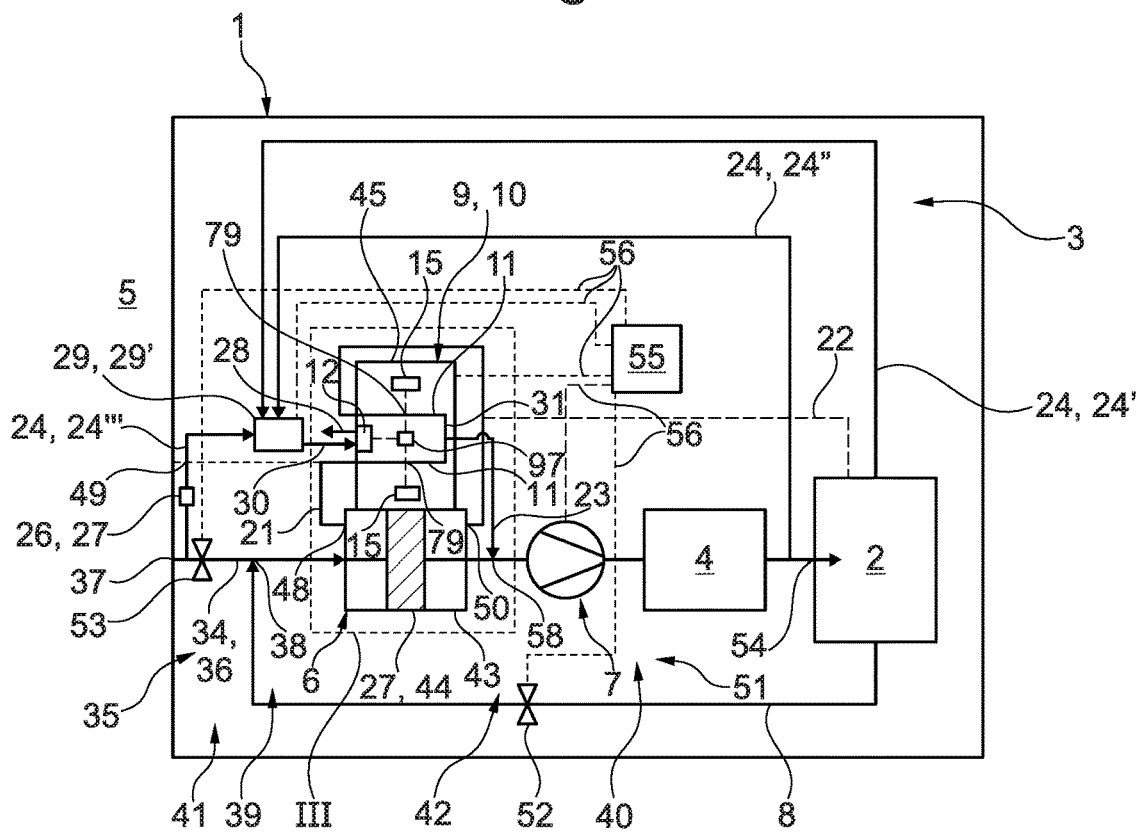

An air-conditioning system 3, as is shown, for example, in FIGS. 1 and 2, is, in particular, an integral part of a motor vehicle 1, which comprises a motor vehicle interior 2 for passengers (not shown). The air-conditioning system 3 supplies air to the vehicle interior 2 to air-condition the vehicle interior 2 and comprises a channel system 35 air flows through during operation. The air-conditioning system 3 comprises at least one heat exchanger 4 arranged in the channel system 35 to air-condition air, wherein the at least one heat exchanger 4 allows for the temperature control of the air and/or the change in humidity in the air. Furthermore, the air-conditioning system 3 comprises a filter device 6 in the channel system 35, hereinafter also referred to as a system filter device 6, to filter the air supplied to the interior 2, as well as a conveying device 7, hereinafter also referred to as a system conveying device 7, to convey air through the air-conditioning system 3. In the examples shown, the heat exchanger 4 is arranged downstream from the conveying device 7 and the filter device 6 is arranged upstream to the conveying device 7. The channel system 35 comprises an outside-air channel 36, with which outside air, meaning from the ambient environment 5 of the air-conditioning system 3 or the motor vehicle 1, enters into the air-conditioning system 3. In the examples shown, the outside-air channel 36 extends from a system inlet 37 connected to the ambient environment 5 up to a system outlet 54, which is fluidically connected to the motor vehicle interior 2, in particular, connected to the motor vehicle interior 2 and via which, air is discharged into the motor vehicle interior 2. Within the outside-air channel 36, which is hereinafter referred to in the following as a main channel 34, the filter device 6, the conveying device 7 and the at least one heat exchanger 4 are arranged. The channel system 35 additionally comprises a circulating-air channel 8, which serves to recirculate air from the motor vehicle interior 2 or inside air. The circulating-air channel 8 is fluidically connected to the vehicle interior 2 and the system outlet 54, wherein the circulating-air channel 8 in the examples shown branches off from the vehicle interior 2 and flows into the main channel 34 at a circulating-air flow-in opening 38 upstream to the filter device 6 and downstream from the system inlet 37.

The air-conditioning system 3 additionally comprises a sensor device 9, which measures at least one characteristic of air. The at least one characteristic of the air measured by means of the sensor device 9 is preferably a characteristic corresponding to the quality of the air or at least correlating with it. In particular, the at least one characteristic can be a particle concentration, in particular, fine-dust particle concentration, the concentration of nitrogen oxides and/or carbon oxides and/or oxygen and the like. The sensor device 9 is, in particular, a fine-dust particle sensor 10 to measures the fine-dust particle content in the air or preferably comprises such a fin-dust particle sensor 10. The sensor device 9 comprises at least one analysis channel 11 and a generation device 12 which air can flow through. The channel system 35 comprises at least one supply channel 21, 22, 23 to supply air to the at least one analysis channel 11. Using the generation device 12, electromagnetic waves 13, in particular, monochromatic electromagnetic waves 13, for example, monochromatic light, are generated, which pass through the analysis channel 11 in an interaction section 79, in particular, penetrating it. Thereby, within the interaction section 79 of the analysis channel 11, it results in an interaction of the electromagnetic waves 13 with the air flowing through the analysis channel 11, which is hereinafter also referred to as air to be analysed, wherein the interaction makes the measurement of the at least one characteristic of the air to be analysed possible. For this purpose, the sensor device 9 comprises a detector 15, which detects the electromagnetic waves 13 after passing through the analysis channel 11 and the interaction with the air. Thereby, in the case of the sensor device 9 designed as a fine-dust particle sensor 10 or comprises such a one, the concentration of the fine dust in the air to be analysed is measured and determined. Thereby, the generation device 12 comprises a source 16 to generate the electromagnetic waves 13 and a controller 17 to control the source 16. In the example shown, the source 16 is designed as a laser 18, which is controlled by means of the controller 17.

For the temperature control of the generation device 12, in particular, of the source 16 and/or the controller 17, a temperature-control channel 24 is provided that is different from the main channel 34 or the at least one supply channel 21, 22, 23 leading to the analysis channel 11, which supplies air-conditioned air to the sensor temperature-control space 19 and thereby applies air-conditioned air to the generation device 12 for the purpose of temperature control of the generation device 12. Thereby, the air-conditioned air can originate from the motor vehicle interior 2 of the vehicle 1. For this purpose, such a temperature-control channel 24', hereinafter also referred to in the following as a first temperature-control channel 24', leads air from the vehicle interior 2 to the sensor temperature-control space 19. Thereby, it results in a heat exchange between the generation device 12 and the air-conditioned air supplied to the sensor temperature-control space 19 so that it results in a temperature control of the generation device 12. In addition or as an alternative, air-conditioned air originating from the main channel 34 can be supplied to the sensor temperature-control space 19 downstream from the at least one heat exchanger 4 and upstream to the vehicle interior 2 and, thereby, it is supplied to the generation device 12. For this purpose, such a temperature-control channel 24" is provided, which is hereinafter referred to in the following as a second temperature-control channel 24". The second temperature-control channel 24" branches off from the main channel 34 downstream from a heat exchanger 4 and upstream to the vehicle interior 2, in particular, from a mixing space (not shown) of the air-conditioning system 3 and flows into the sensor temperature-control space 19. In addition or as an alternative, it is conceivable to branch-off air from the main channel 34 or the outside-air channel 36 with the aid of such a temperature channel 24'", also hereinafter referred to in the following as a third temperature-control channel 24'" upstream to the at least one heat exchanger 4 and upstream to the system filter device 6, thereby supplying outside air to the sensor temperature-control space 19 in order to control the temperature of the generation device 12, wherein, in this case, the outside air is cleaned or filtered beforehand. The air supplied to the sensor temperature-control space 19 for the purpose of controlling the temperature of the generation device 12 flows through the sensor temperature-control space 19 and exits the sensor temperature-control space 19 via a sensor outlet 47 and a sensor temperature-control outlet channel 28.

It is preferred if the air serving to control the temperature of the generation device 12 supplied to the sensor temperature-control space 19 is cleaned or filtered before applying it to the generation device 12, in particular, in order to avoid or reduce a dirtying of the source 16 or a wave outlet area (not shown) of the source 16. For this purpose, the system filter device 6 can be used. It is also conceivable, in particular, in the second temperature-control channel 24" and/or in the third temperature-control channel 24'" to provide a filter device 26, also hereinafter referred to in the following as a sensor-temperature-control filter device 26, that is separate from the system filter device 6 in order to filter the air before it enters into the sensor temperature-control space 19. The respective sensor-temperature-control filter device 26 can comprise a fine-particle filter 27 or be designed as such. In the examples shown, such a sensor-temperature-control filter device 26 is only provided in the third temperature-control channel 24'", wherein it is also conceivable to provide such a sensor temperature-control filter device 26 in the first temperature-control channel 24'. In the examples shown, the temperature-control channels 24 flow into a sensor-control valve device 29, in particular, into a multi-port valve 29', the respective outlet of which is fluidically connected to the sensor temperature-control space 19 via a sensor-temperature-control supply channel 30. With the sensor-temperature-control valve device 29, it is possible to optionally supply air from the respective temperature-control channel 24' to the sensor temperature-control space 19, thereby applying air to the generation device 12 for the purpose of controlling the temperature with air. Naturally, it is also possible to makes the air originating from at least two of the temperature-control channels 24 and supply them to the sensor temperature-control space 19. Thereby, such a sensor-temperature-control filter device 26 can be provided in the sensor-temperature-control supply channel 30 (not shown) in order to do without respectively separate such sensor-temperature-control filter devices 26 within the temperature-control channel 24.

In the case of the examples shown in FIGS. 1 to 4, the sensor device 9 comprises two such analysis channels 11 spaced away from each other, wherein the generation device 12 is arranged between the analysis channels 11, which primarily run in parallel. The generation device 12, in particular, the laser 18, is arranged in such a way that it emits the generated electromagnetic waves 13 between and along the analysis channels 11. The sensor device 9 comprises a deflection device 97, which supplies the electromagnetic waves 13 emitted from the generation device 12 to the interaction section 79 of at least the analysis channels 11 in such a way that the deflected electromagnetic waves 13 penetrate and pass through the interaction section 79, thereby interacting with the air flowing through the analysis channel 11. After interacting with the air, the deflected electromagnetic waves 13 are detected by a related detector 15 in order to measure at least one characteristic of the air, with which the electromagnetic waves 13 previously interacted. In the exemplary embodiments shown in FIGS. 1 to 4, the deflection device 97 is designed in such a way that it deflects the electromagnetic waves 13 emitted from the generation device 12 toward the interaction section 79 of the respective analysis channel 11. That means that the deflection device 97 deflects the emitted electromagnetic waves 13 both in the direction of the interaction section 79 of the analysis channel 11 as well as in the direction of the interaction section 79 of the other analysis channel 11. For this purpose, the deflection device 97 can comprise an electromagnetic-wave-carrying 13 conductor 104, in particular, a glass fibre 105 (see FIG. 6), a mirror, a beam separator or a combination thereof (respectively not shown). Thereby, such a detector 15 is assigned to the respective analysis channel 11 so that, with the aid of the same generation device 12, at least one characteristic of the air flowing through the one analysis channel 11, and independently of this, of the air flowing through the other analysis channel 11 can be measured. The detector 15 assigned to the respective analysis channel 11 or the interaction section 79 is favourably arranged on the side of the interaction section 79 facing away from the entry side of the electromagnetic waves 13 into the related interaction section 79 and outside the interaction section 79. By means of this, the detection of the electromagnetic waves 13 deflected in the direction of the other interaction section 79 is prevented or at least reduced and/or an independent measurement of the at least one characteristic of the air flowing through the respective analysis channel 11 is made possible. The arrangement of the respective detector 15 outside of the interaction section 79 has the consequence that the dirtiness of the detector 15 is less or at least reduced by the air flowing though the respective analysis channel 11.

The system conveying device 7 divides the channel system 35 into an upstream-side suction area 39 and a downstream-side pressure area 40. That means that the conveying device 7 separates the suction area 39 arranged upstream to the conveying device 7 from the pressure area 40 arranged downstream from the conveying device 7. Additionally, the system conveying device 6 divides the channel system 35 into an upstream-side raw area 41 and a downstream-side pure area 42. The system filter device 6 comprises a housing 43, hereinafter also referred to in the following as filter housing 43, in which a filter material 44 is arranged to filter air, which can be a fine-dust particle filter 27 or part of such a filter. Thereby, air passing through the filter material 44 is cleaned so that the separation of the channel system 35 into the raw area 41 and the clean area 42 takes place with the aid of filter material 44.

The sensor device 9 comprises a housing 45, hereinafter referred to in the following as a sensor housing 45, in which the at least one analysis channel 11 is arranged. In the example shown, additionally, the generation device 12 as well as the detectors 15 are arranged within the sensor housing 45. The sensor device 9 additionally comprises a sensor inlet 46, through which air is let into the sensor device 9, in particular, into the at least one analysis channel 11. Thereby, the sensor devices 9 shown in FIG. 1 to 4 respectively comprises two such sensor inlets 46, which are each fluidically connected to such an analysis channel 11. In addition, such a sensor inlet 46 is fluidically connected to the sensor temperature supply channel 30 in order to let air into the sensor temperature-control space 19. The sensor device 9 additionally comprises at least one sensor outlet 47 to let out air from the sensor device 9, wherein, in the examples shown, such a sensor outlet 47 is provided to let out air flowing through the at least one analysis channel 11 and such a sensor outlet 47 is provided to let out air from the sensor temperature-control space 19, which is fluidically connected to a sensor-temperature-control outlet channel 28. The air flowing out of the respective sensor outlet 47 can principally be supplied to the ambient environment 5, as this is, for example, shown for the air flowing into the sensor temperature-control outlet channel 28. The air flowing from respective sensor outlet 47 can also be supplied to the channel system 35, as is shown, for example, for the sensor outlet 47 fluidically connected to the at least one analysis channel 11. For this purpose, a sensor return channel 57 is provided, which is fluidically connected to this sensor outlet 47 and flows into the main channel 34, for example, via a sensor flow-in opening 58, wherein, in the examples shown, the sensor flow-in opening 58 is arranged between the system filter device 6 and the system conveying device 7. It is also conceivable to arrange the sensor flow-in opening 58 upstream to the sensor filter device 6 and to arrange it in the raw area 41 in order to filter the fed-back air with the system filter device 6.

The sensor housing 45 is arranged on the filter housing 43. This allows the sensor device 9 to be supplied with air, in particular, air to be analysed easily or/and with a reduced amount of fluidic connections.

In the examples shown, in the raw area 41, a raw branch-off point 48 is arranged, which is fluidically connected to such a sensor inlet 46 to let air in from the raw area 41, meaning before the air has passed through the filter material 44, into the sensor device 9 in order to provide one of the analysis channels 11 with air and measure at least one characteristic. For this purpose, a sensor-raw air supply channel 21 is provided, which runs from the raw branch-off point 48 to such a sensor inlet 46. The raw branch-off point 48 is preferably arranged downstream from the circulating-air flow-in opening 38. In addition or as alternative, as shown with the dashes, a sensor inlet channel 49 can be provided to let in air from the ambient environment 5 or the outside air into the sensor device 9, in particular, into such an analysis channel, wherein the sensor inlet channel 49 is separate from the outside-air channel 36 or the main channel 34. If such a sensor inlet channel 49 is provided, it is conceivable to arrange a valve (not shown) within the sensor inlet channel 49 and/or within the sensor-raw-air supply channel 21 so that air can be supplied to the sensor device 9 using this valve via the raw branch-off point 48 or directly from the ambient environment 5. In addition, a pure branch-off point 50 is arranged in the clean area 42 of the channel system 35, which is fluidically connected to such a sensor inlet 46 to let in air from the clean area 42, meaning after the air has passed through the filter material 44, into the sensor device 9 in order to provide one of the analysis channels 11 with air and measure at least one characteristic of air. The fluidic connection takes place by means of a sensor clean air supply channel 23, which runs from the pure branch-off point 50 to the related sensor inlet 46. Thereby, the pure branch-off point 50 is arranged upstream to the conveying device 7, wherein an arrangement is also possible downstream from the conveying device 7 and upstream to the at least one heat exchanger 4.

The air-conditioning system 3 comprises a shutoff device 51, which comprises a circulating-air shutoff valve 52, in particular provided within the circulating-air channel 8 and an outside-air shutoff valve 53 arranged within the outside-air channel 36 or the main channel 34. Thereby, the circulating-air flow-in opening 38 is arranged downstream to the outside-air shutoff valve 53. The shutoff device 51 can be adjusted between a circulating-air position and an outside-air position, wherein, in the circulating-air position, the outside-air shutoff valve 53 shuts off the outside-air channel 36 or the main channel 34 and the circulating-air shutoff valve 52 releases the circulating-air channel 8 so that no air enters from the ambient environment 5 and, thereby, no outside air enters into the air-conditioning system 3, whereas air from the vehicle interior 2 and thereby, inside air, is sucked with the aid of the conveying device 7 from the motor vehicle interior 2 and is fed back via the system outlet 54 to the vehicle interior 2, thereby being recirculated. Thereby, the air originating from the vehicle interior 2 within the air-conditioning system 3 passes into the filter device 6 as well as the at least one heat exchanger 4 due to the arrangement of the circulating-air flow-in opening 38. In the outside-air position, in contrast, the circulating-air channel 8 is closed with the aid of the circulating-air shutoff valve 52 while the outside-air shutoff valve 53 releases the outside-air channel 36. Thereby, a flow of air through the circulating-air channel 8 is hindered, whereby air from the ambient environment 5 and thereby outside air enter into the air-conditioning system 3. In this way, via the raw branch-off point 48, in the air-circulation position, air can flow from the motor vehicle interior 2 and, in the outside-air position, air can flow from the ambient environment 5 or the outside air so that, via the raw branch-off point 48, both inside air as well as outside air can be analysed as air to be analysed using the sensor device 9, in particular one characteristic of the air to be analysed can be measured. The system conveying device 7 is arranged between the circulating-air shutoff valve 52 and the outside-air shutoff valve 53. In this way, using this system conveying device 7, it is possible to convey air from the ambient environment 5 in the outside-air position and to convey air from the vehicle interior 2 in the circulating-air position and to supply it to the system outlet 54. Naturally, by means of this, it is also possible to convey both air from the vehicle interior 2 as well as air from the ambient environment 5 in intermediate positions and to supply it to the system outlet 54.

As an alternative or in addition, the channel system 35 can comprise a sensor inside air supply channel 22, which is shown with the dashes, which directly supplies air from the vehicle interior 2 to the sensor device 9 or such an analysis channel 11.

The air-conditioning system 3 additionally comprises a control device 55, which can also be an integral part of the motor vehicle 1. The control device 55 is connected via communication connections 56 to the sensor device 9, the shutoff device 51 and, thereby, with the shutoff valves 52, 53, with the system conveying device 7 as well as with the sensor-temperature-control valve device 29 on a communicative level in such a way that the control device 55 can control/or query these respectively. In addition, the control device 55 can be connected to the controller 17 of the generation device 12 in a communicative manner in order to control and/or query this.

In particular, the control device 55 is designed in such a way that it operates the air-conditioning system 3 in outside-air mode if the quality of the outside air exceeds a specified value, in particular, if it is better than the quality of air from the vehicle interior 2, whereas it operates the air-conditioning system 3 in an circulating-air mode if the quality of the outside air sinks below a specified value and/or the quality of the air within the vehicle interior 2 is better than the quality of the outside air. For this purpose, the control device 55 adjusts the shutoff device 51 into the circulation position in the circulating-air mode and into the outside-air position in the outside-air mode. Naturally, positions between the air-circulation position and the outside-air position are also possible like operating the air-conditioning system 3 between the circulating-air mode and outside-air mode.

The exemplary embodiment shown in FIG. 2 differs from the exemplary embodiment shown in FIG. 1 primarily due to the fact that the raw branch-off point 48 and the pure branch-off point 50 are arranged on the filter housing 43 and thereby directly arranged on the system filter device 6, in particular, designed within the filter housing 43. By means of this, air can be supplied to the sensor device 9 in a simpler manner and with reduced assembly-space requirements.

Figure 3:
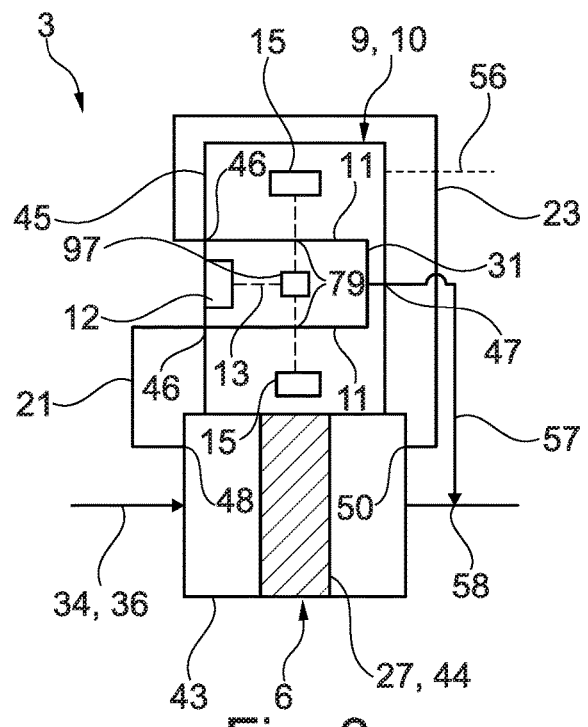

FIG. 3 shows an enlarged illustration of the area indicated with III in FIG. 2, and thereby, primarily the sensor device 9 and the system filter device 6, wherein the sensor temperature-control supply channel 30 and the sensor temperature-control outlet channel 28 are not shown for the sake of clarity. In FIG. 3, it can particularly be recognized that the sensor housing 45 and the filter housing 43 directly adjoin each other. In particular, the sensor housing 45 and the filter housing 43 rest on each other directly, wherein it is also conceivable to arrange a seal (not shown) and/or a decoupling element (not shown) between the filter housing 43 and the sensor housing 45 for the mechanical decoupling of the sensor housing 45 from the filter housing 43.

Figure 4:
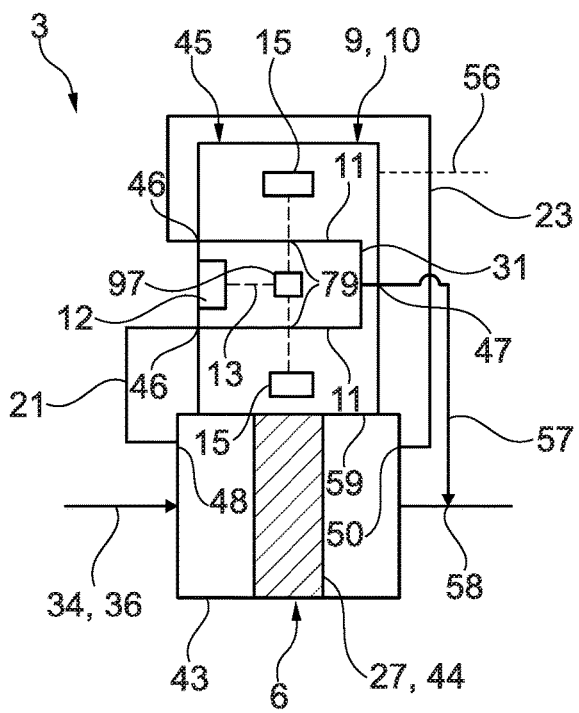
FIG. 4 the representation from FIG. 3 in the case of another exemplary embodiment, FIG. 5 the representation from FIG. 3 in the case of another exemplary embodiment, FIG. 6 the representation from FIG. 3 in the case of another exemplary embodiment, FIG. 7 a longitudinal cross-section through a sensor device of the air-conditioning system in the case of another exemplary embodiment.

FIG. 4 shows another exemplary embodiment of the air-conditioning system 3, which differs from the exemplary embodiment shown in FIG. 3 due to the fact that the sensor housing 45 and the filter housing 43 comprises a joint wall 59. The sensor housing 45 and the filter housing 43 are fluidically separated from each other by a joint wall 59 and mechanically connected to one another. This can reduce the assembly-space requirements and make the supply of air to the sensor device easier.

Figure 5:
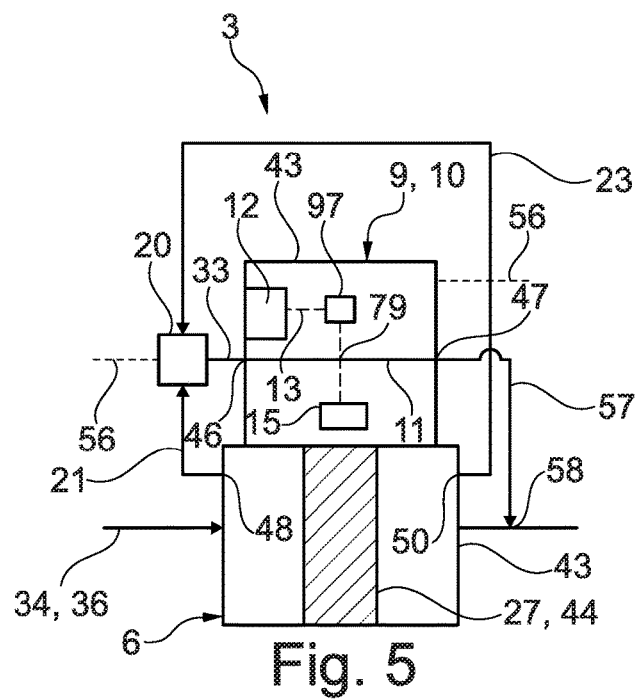

Another exemplary embodiment of the air-conditioning system 3 is shown in FIG. 5. This exemplary embodiment differs from the exemplary embodiment shown in FIG. 3 due to the fact that the sensor device 9 only comprises such an analysis channel 11 as well as a sensor inlet 46 that is fluidically connected to the analysis channel 11. Thereby, the sensor-raw air supply channel 21 and the sensor pure-air supply channel 23 flows in into the sensor valve device 20, which is connected to the control device 55 by means of such a communication connection 56. With the aid of the sensor valve device 20, it is possible to optionally supply air from the sensor-raw-air supply channel 21 and thereby from the raw area 41 or air from the sensor pure-air supply channel 23 and thereby from the pure area 42 to the analysis channel 11. In this exemplary embodiment, according to this, only such a detector 15 is provided. Thereby, a sensor supply channel 33 connects the sensor valve device 20 to the sensor inlet 46. It would also be conceivable to connect the sensor valve device 20 directly to the sensor inlet 46 on the outlet side. It is also conceivable to arrange the sensor valve device 20 within the sensor device 9, in particular, within the sensor housing 43. In the case of this example, the generation device 12 is also arranged in such a way that the generated electromagnetic waves 13 are omitted distanced away from the analysis channel 11 and along the analysis channel 11. The detection device 97 deflects the electromagnetic waves 13 emitted by the generation device 12 toward the interaction section 79 of the analysis channels 11 in such a way that the deflected electromagnetic waves 13 pass through and penetrate the interaction section 79, thereby interacting with the air flowing through the analysis channel 11.

Figure 6:
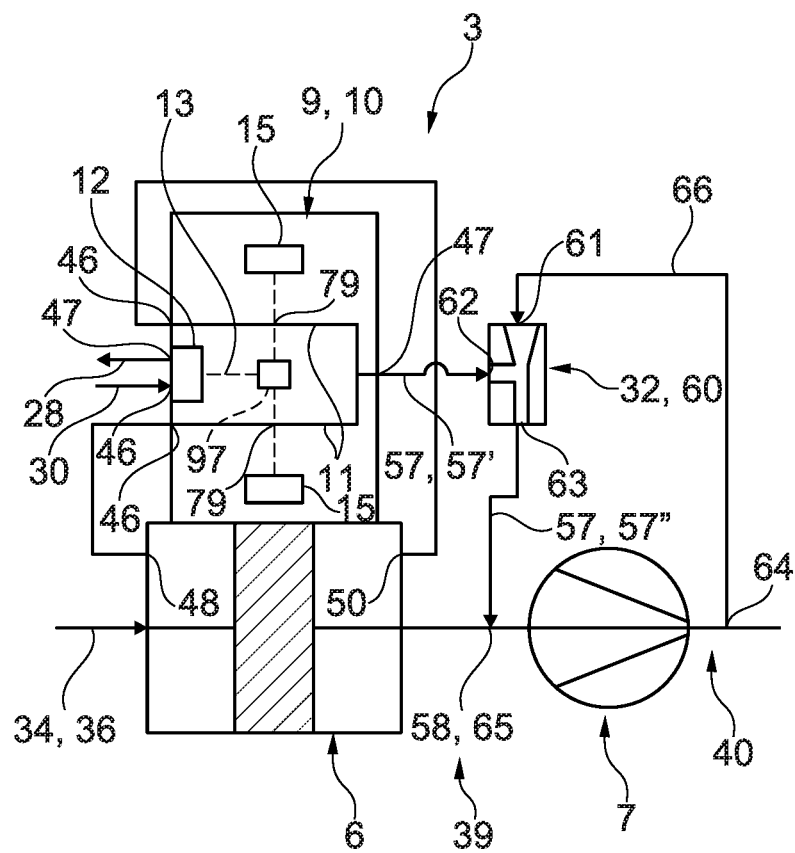

FIG. 6 shows another exemplary embodiment of the air-conditioning system 3 and of the motor vehicle 1. This exemplary embodiment differs from the example shown in FIG. 3, particularly due to the fact that the air-conditioning system 3 comprises a conveying device 32 that is separate from the system conveying device 7 to convey air through the sensor device 9, hereinafter also referred to in the following as a sensor conveying device 32. The sensor conveying device 32 is designed as a suction jet pump 60, which comprises a motive-fluid inlet 61, a suction inlet 62, as well as a pump outlet 63. The motive-fluid inlet 61 is fluidically connected to the pressure area 40 via a suction jet branch-off point 64 within the channel system 35 present in the main channel 34 so that air flows from the pressure area 40 into the suction jet pump 60 to drive the suction jet pump 60 by means of the motive-fluid inlet 61. In addition, the suction and 62 is fluidically connected to such a sensor outlet 47, wherein, in the example shown in FIG. 1, the suction inlet 62 is fluidically connected to the sensor outlet 47, which is fluidically connected to the analysis channels 11 via the sensor discharge channel 31 in such a way that the suction jet pump 60 sucks the air flowing through the analysis channels 11 out of the sensor device 9, thereby conveying it. In this example, the said sensor outlet 47 with a first section 57' of the sensor feedback channel 57 is connected to the suction inlet 62, while a second section 57" of the sensor feedback channel 57 is connected to the pump outlet 63 and is connected to the channel system 35, in particular, to the main channel 34, via the sensor flow-in opening 58 so that the air flowing out of the pump outlet 63, which consists of the air flowing through the motive-fluid inlet 61 and the suction inlet 62, flows back via the sensor flow-in opening 58, which is simultaneously a suction jet flow-in opening 65. The fluidic connection between the motive-fluid inlet 61 and the suction jet branch-off point 64 takes place via an motive-fluid supply channel 66, which extends from the suction jet branch-off point 64 to the motive-fluid inlet 61. In the example shown, additionally, the suction jet flow-in opening 65 and the sensor flow-in opening 58 is arranged upstream to the suction jet branch-off point 64 and the system conveying device 7 and within the suction area 39 accordingly. The suction jet pump 60 is driven by the system conveying device 7 and conveys air through the sensor device 9 in a known way, wherein, in the example shown, the air flowing through the analysis channels 11 to be analysed is conveyed with the aid of the suction jet pump 60. It is also conceivable to fluidically connect the sensor outlet 47, which is connected to the sensor temperature-control outlet channel 28, to the suction inlet 62 of the jet pump 60 in order to use the air used to convey the temperature of the generation device 12 with the aid of the suction jet pump 60.

Figure 7:
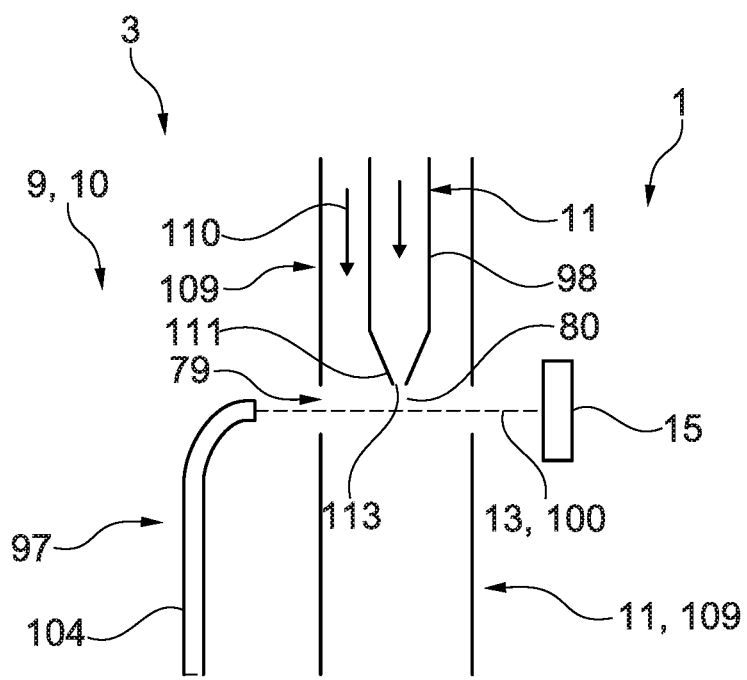

FIG. 7 shows a cross-section through the sensor device 9 and the air-conditioning system 3 in another exemplary embodiment, wherein a longitudinal section through such an analysis channel 11 can be seen. Furthermore, only the deflection device 97, which comprises a conductor 104 belonging to the interaction section 79 of the analysis channel 11 shown, and the related detector 15 can be seen. In this exemplary embodiment, the respective interaction section 79 is formed by a break 80 of a channel sheath 98 limiting the flow of air within the analysis channel 11. The analysis channel 11 is surrounded by a sheath air channel 109, which adjoins a sheath air flow path 110 of the sheath air flowing through the sheath air channel 109. The sheath air is preferably different from the air flowing through the analysis channel 11, in particular, cleaned air, for example, air filtered by means of the system filter device 6. The sheath air flow path 110 surrounds the break 80 of the analysis channel 11, which forms the interaction section 79 in such a way that the sheath air flow path 110 limits, on the outside, the flow of the air flowing through the analysis channel 11 through the interaction section 79 on the outside. In other words, the sheath air flow path 110 prevents that air flowing through the analysis channel 11 in the interaction section 79 flows out of the analysis channel 11 and the sensor device 9, in particular, the generation device 12, the respective detector 5 and/or the deflection device 97 is dirtied. The sheath air channel 109 preferably comprises a break 80 that is aligned with the break 80 of the analysis channel 11, thereby being aligned to the interaction section 79, wherein the breaks 80 of the channels 11, 109 are arranged in such a way that the related deflected electromagnetic waves 13 penetrate through these without interaction with the channel sheath 98 and the sheath air channel 109. Since the sheath air is cleaned and filtered air, thereby, the interaction of the deflected electromagnetic waves 13 with the sheath air is prevented or at least reduced.

In the case of this exemplary embodiment, the analysis channel 11 in the sheath air channel 109 downstream from the interaction section 79 run together and are uniform. That means that the air and the sheath air flowing through the analysis channel 11 dare mixed an are led together downstream from the interaction section 79. In particular, this mixture can be traced back to the channel system 39 via the sensor outlet 47.

In the case of this exemplary embodiment, the analysis channel 11 comprises a channel nozzle 111 flowing into the interaction section 79. The channel nozzle 111 is tapered in the flow direction of the air flowing through the analysis channel 11 in the flow direction to the interaction section 79. As a result, and escape of the air flowing through the analysis channel 11 outside of the interaction section 79, in particular, into the sensor housing 45 is prevented or at least reduced.

Figure 8:
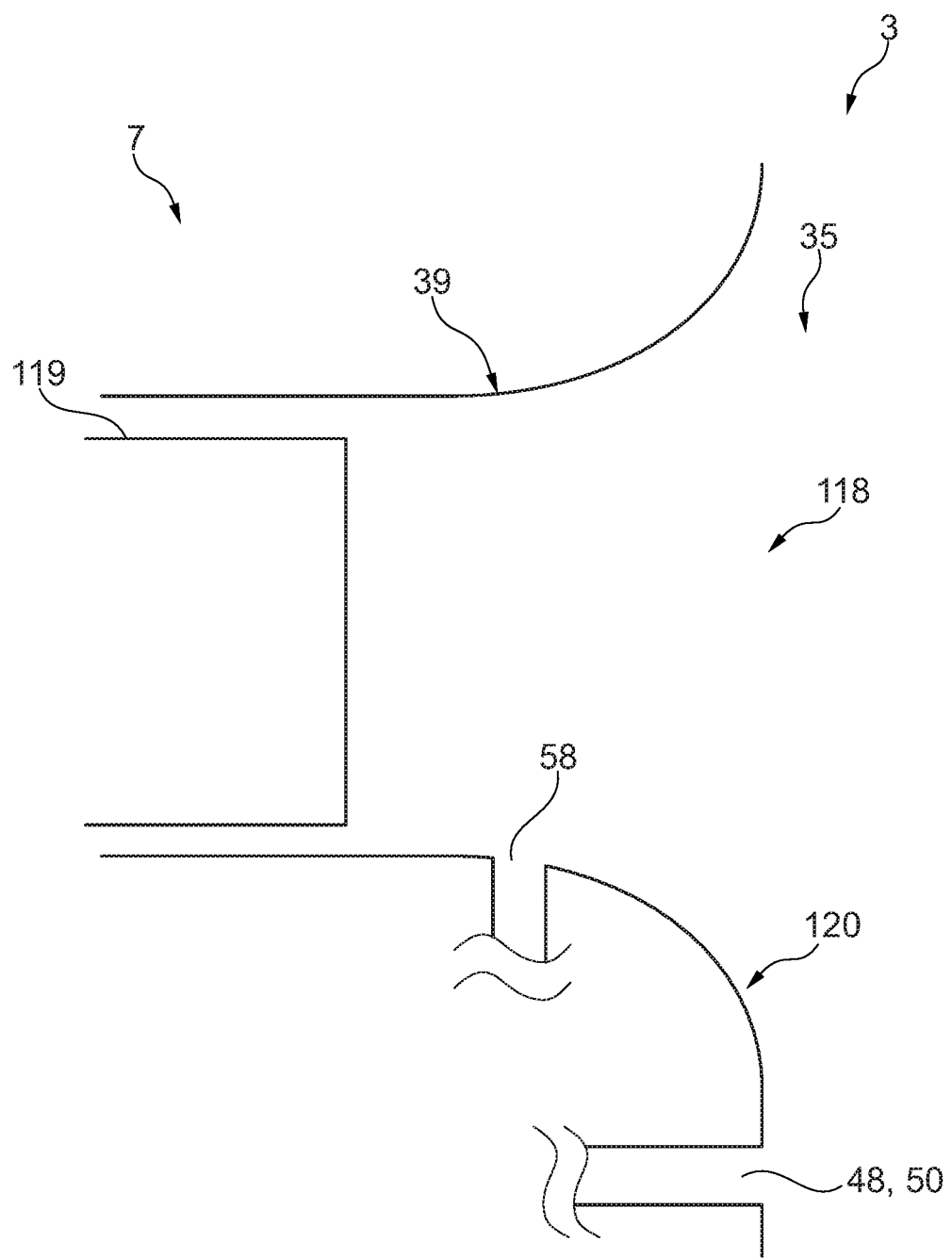
FIG. 8 a cross-section through a system conveying device of the air-conditioning system in the case of another exemplary embodiment.

The system conveying device 7 comprises a housing 118, as shown in FIG. 8, which is also referred to in the following as a conveying device housing 118 and in which a rotor 119 is arranged to convey the air. In the example shown in FIG. 7, the sensor flow-in opening 58 fluidically connected to the sensor outlet 47 and the branch-off point 48, 50 fluidically connected to the sensor inlet 46, which means the raw branch-off point 48 and/or pure branch-off point 50, are each arranged in the suction area 39 and in the area of the conveying device housing 118, thereby being arranged in the area of the conveying device housing 118 on the suction side. In the example shown, the conveying device housing 118 comprises a nozzle like inlet frame 120, wherein the sensor flow-in opening 58, preferably also the branch-off point 48, 50, is/are arranged and formed within the area of the inlet frame 120, in particular, on the inlet frame 120.

The invention claimed is:
1. An air-conditioning system of a motor vehicle to air-condition a vehicle interior, comprising:
a channel system, which air flows through during operation;
an outside-air channel configured to let outside air into the channel system;
a system conveying device configured to convey air arranged in the channel system, which separates a suction area arranged upstream to the system conveying device from a pressure area arranged downstream from the system conveying device within the channel system;
a system filter device arranged within the channel system to filter air, which separates a raw area arranged upstream from the system filter device from a pure area arranged downstream from the system filter device;
the system filter device including a filter housing, in which a filter material to filter air is arranged;
a system outlet arranged within the pure area to let out air into the vehicle interior;
a sensor device to measure a characteristic of air including a sensor housing, in which at least one analysis channel is arranged, which air, a characteristic of which is measured, flows through during operation;
the sensor device including at least one sensor inlet to let air into the sensor device and at least one sensor outlet to let air out of the sensor device;
wherein the sensor housing is arranged on the filter housing; and
wherein the at least one sensor inlet is fluidically connected to a sensor inlet channel, which is separate from the outside-air channel, to let outside air into the sensor device.
2. The air-conditioning system according to claim 1, wherein the sensor housing abuts the filter housing.
3. The air-conditioning system according to claim 1, wherein the filter housing and the sensor housing include a joint wall.
4. The air-conditioning system according to claim 1, further comprising a raw branch-off point arranged within the raw area, which is fluidically connected to the at least one sensor inlet to let air from the raw area into the sensor device.
5. The air-conditioning system according to claim 4, wherein the raw branch-off point is arranged on the filter housing.
6. The air-conditioning system according to claim 1, further comprising a pure branch-off point arranged within the pure area, which is fluidically connected to the at least one sensor inlet to let air into the sensor device.
7. The air-conditioning system according to claim 6, wherein the pure branch-off point is arranged on the filter housing.
8. The air-conditioning system according to claim 1, wherein:

the channel system includes a circulating-air channel to recirculate air from the vehicle interior, which is fluidically connected to the vehicle interior and the system outlet; and the air-conditioning system further comprises a shutoff device with an outside-air shutoff valve arranged within the outside-air channel and a circulating-air shutoff valve arranged within the circulating-air channel, which is adjustable between a circulating-air position, in which the outside-air shutoff valve shuts off the outside-air channel and the circulating-air shutoff valve releases the circulating-air channel, and an outside-air position, in which the outside-air shutoff valve releases the outside-air channel and the circulating-air shutoff valve shuts off the circulating-air channel.

9. The air-conditioning system according to claim 8, wherein the system conveying device is arranged between the circulating-air shutoff valve and the outside-air shutoff valve.

10. The air-conditioning system according to claim 1, further comprising:
a suction jet pump including a motive-fluid inlet, a suction inlet and a pump outlet;
the motive-fluid inlet fluidically connected to the pressure area via a suction jet branch-off point within the channel system; and
the suction inlet fluidically connected to the sensor outlet.

11. The air-conditioning system according to claim 1, wherein, in the suction area, a sensor flow-in opening is arranged, which is fluidically connected to the at least one sensor outlet to let air out of the sensor device.

12. The air-conditioning system according to claim 11, wherein:
the system conveying device includes a conveying device housing, in which a rotor of the system conveying device is arranged to convey the air;
the sensor flow-in opening is arranged on a suction side of the conveying device housing in an area of the conveying device housing; and
a branch-off point fluidically connected to the at least one sensor inlet to branch-off the air from the channel system is arranged upstream to the sensor flow-in opening.

13. The air-conditioning system according to claim 12, wherein:
the conveying device housing includes an inlet frame arranged on the suction side; and
at least one of the sensor flow-in opening and the branch-off point is arranged in an area of the inlet frame.

14. The air-conditioning system according to claim 1, wherein the sensor device further includes a sheath air channel circumferentially surrounding and extending axially along the analysis channel such that an air flow channel, through which air filtered via the filter device is flowable, is defined radially between the analysis channel and the sheath air channel.

15. A vehicle, comprising a vehicle interior and an air-conditioning system to air-condition the vehicle interior, the air-conditioning system including:
a channel system which air flows through during operation;
an outside-air channel configured to let outside air into the channel system;
a system conveying device configured to convey air arranged in the channel system, which separates a suction area arranged upstream to the system conveying device from a pressure area arranged downstream from the system conveying device within the channel system;
a system filter device arranged within the channel system to filter air, which separates a raw area arranged upstream from the system filter device from a pure area arranged downstream from the system filter device;
the system filter device including a filter housing, in which a filter material to filter air is arranged;
a system outlet arranged within the pure area to let out air into the vehicle interior;
a sensor device to measure a characteristic of air including a sensor housing, in which at least one analysis channel is arranged, which air, a characteristic of which is measured, flows through during operation;
the sensor device including at least one sensor inlet to let air into the sensor device and at least one sensor outlet to let air out of the sensor device;
wherein the sensor housing is arranged on the filter housing; and
wherein a pure branch-off point is arranged within the pure area and is fluidically connected to the at least one sensor inlet to let air into the sensor device.

16. The vehicle according to claim 15, wherein the air-conditioning system further includes a suction jet pump including:
a motive-fluid inlet fluidically connected to the pressure area via a suction jet branch-off point within the channel system;
a suction inlet fluidically connected to the sensor outlet; and
a pump outlet.

17. The vehicle according to claim 16, wherein the at least one sensor inlet is fluidically connect to a sensor inlet channel structured and arranged to allow outside air to flow into the sensor device.

18. An air conditioning system of a motor vehicle, comprising:
a channel system through which air is flowable;
an outside-air channel structured and arranged such that an outside air is flowable into the channel system;
a system conveying device configured to convey air within the channel system, the system conveying device separating a suction area from a pressure area, the suction area arranged within the channel system upstream from the system conveying device, the pressure area arranged in the channel system downstream from the system conveying device;
a system filter device arranged within the channel system configured to filter air, the system filter device separating a raw area from a pure area, the raw area arranged upstream from the system filter device, the pure area arranged downstream from the system filter device, the system filter device including a filter housing and a filter material configured to filter air, the filter material arranged in the filter housing;
a system outlet disposed within the pure area, the system outlet structured and arranged such that air is flowable into a vehicle interior;
a sensor device configured to measure a characteristic of air, the sensor device including a sensor housing arranged on the filter housing, at least one sensor inlet through which air is flowable into the sensor device, and at least one sensor outlet through which air is flowable out of the sensor device;

at least one analysis channel arranged within the sensor housing through which air, a characteristic of which is measured, is flowable;

a raw branch-off point arranged within the raw area and fluidically connect to the at least one sensor inlet such that air from the raw area is flowable into the sensor device; and a pure branch-off point arranged within the pure area and fluidically connected to the at least one sensor inlet such that air from the pure area is flowable into the sensor device.

19. The air-conditioning system according to claim 18, wherein the pure branch-off point and the raw branch-off point are arranged on the filter housing.

20. The air-conditioning system according to claim 18, further comprising a shutoff device adjustable to a circulating-air position and an outside-air position, wherein:

the channel system includes a circulating-air channel structured and arranged to recirculate air from the vehicle interior, the circulating-air channel fluidically connected to the vehicle interior and the system outlet;

the shut off device includes an outside-air shutoff valve arranged within the outside-air channel and a circulating-air shutoff valve arranged within the circulating-air channel;

the outside-air shutoff valve shuts off the outside-air channel and the circulating-air shutoff valve releases the circulating-air channel when the shutoff device is in the circulating-air position; and the outside-air shutoff valve releases the outside-air channel and the circulating-air shutoff valve shuts off the circulating-air channel when the shutoff device is in the outside-air position.

\* \* \* \* \*